(12) United States Patent (10) Patent No.: US 8,496,482 B2
Kinsinger (45) Date of Patent: Jul. 30, 2013

(54) HANDWRITING INSTRUMENT

(76) Inventor: Ellen J. Kinsinger, Cedar Rapids, IA (US)

( * ) Notice: Subject to any disclaimer, the term of this patent is extended or adjusted under 35 U.S.C. 154(b) by 590 days.

(21) Appl. No.: 12/589,077

(22) Filed: Oct. 19, 2009

(65) Prior Publication Data

US 2011/0091843 A1 Apr. 21, 2011

(51) Int. Cl.
*G09B 11/00* (2006.01)
(52) U.S. Cl.
USPC .......................................................... 434/162
(58) Field of Classification Search
USPC ............ 434/115, 117, 162, 163, 164; 33/562, 33/564, 566
See application file for complete search history.

(56) References Cited

U.S. PATENT DOCUMENTS

| | | | | |
|---|---|---|---|---|
| 4,268,256 A | * | 5/1981 | Moskowitz | 434/162 |
| D356,820 S | * | 3/1995 | McClain et al. | D19/1 |
| 6,302,696 B1 | * | 10/2001 | O'Neill | 434/162 |
| 7,118,135 B2 | * | 10/2006 | Tims et al. | 283/117 |
| 7,407,383 B2 | * | 8/2008 | Bean | 434/162 |
| 7,581,955 B2 | * | 9/2009 | Schulken | 434/162 |

* cited by examiner

*Primary Examiner* — Kurt Fernstrom
(74) *Attorney, Agent, or Firm* — Catherine A. Shultz

(57) ABSTRACT

A handwriting instrument to provide visual and tactile cues to teach and improve handwriting includes a writing medium, a rectangular writing box on the writing medium. The rectangular writing box consists of first and second vertical end lines connecting ends of an upper horizontal line, a lower raised horizontal line and a dashed line located between the upper and lower horizontal lines extending from the first vertical line to the second vertical line. The area between the lower raised horizontal line and the dashed horizontal line is shaded a different color than the writing medium to provide further visual cues for handwriting.

16 Claims, 2 Drawing Sheets

HANDWRITING INSTRUMENT

FIELD OF THE INVENTION

The present invention relates to instruments used in teaching and improving handwriting. More particularly, the present invention relates to instruments that can be used by teachers, therapists or others to provide visual and tactile cues to help one learn, relearn or improve their handwriting.

BACKGROUND

The art of writing is a multi-complex task that requires the fine motor ability to hold a writing tool and manage the small muscles of the hand to coordinate smooth legible formation of each letter. It requires the visual perceptual task of knowing where to place each letter, creating each letter with the correct dimensions, and adequately spacing each word. It requires the cognitive skill of learning letter formation and learning so completely that this skill becomes automated. In addition to the mechanics is the written language component which includes spelling, grammar, and the message the writer wishes to convey. When a person has difficulty with any of all of these tasks, written expression becomes difficult.

To help one with learning how to write, the type of handwriting paper used can be very beneficial in teaching letter placement, letter dimensions, word spacing and many other facets of writing in the most effective and efficient way possible.

The typical handwriting paper in schools and on the general market is a lightweight paper with horizontal writing lines printed throughout, and a dashed line between each of the horizontal lines. It is typically printed on newsprint (paper which is gray in color and thin in weight) with various ruled widths. This paper has proven to be very confusing to some learning to write, especially to young children who are still struggling with the basic writing concepts of top to bottom, left to right, and tall and short letters.

Some attempts at providing visual cues have been made. One attempt involved using multiple colored lines, lines placed next to each other, or embossing all lines on paper. These have been proven to be confusing to the student trying to learn how to write while also trying to remember a large variety of cues that do not all relate to the paper, the letters and the writing.

SUMMARY

The present invention attempts to overcome the deficiencies cited above by providing simple visual and tactile cues in the form of clear spaced-out rectangular boxes, shading, dashed lines, and raised lines to help one learn how to write or improve their writing.

Each rectangular writing box has been separated from the rest to help the individual locate the writing area easily. The lines at the ends of each rectangular box signify where the writing should begin and stop. The lower half of the writing area has been emphasized by shading to indicate where the lower case letters should be placed. The line at the bottom of the writing area has been elevated from the rest of the page enough so that the writer is able to tactically perceive the line, but at a level that a writing instrument could still easily cross over the line to form letters that have tails which go below the line. Since the paper is simplified visually with a few key visual and tactile cues which are easy to understand and remember, the student is able to form letters correctly and legibly, as well as easily place and space letters and words when writing.

The above summary of the present invention is not intended to describe each disclosed embodiment or every implementation of the present invention. The figures and the detailed description which follow more particularly exemplify illustrative embodiments.

While some of the above-identified figures set forth one or more embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. It should also be understood that the above-identified figures are not drawn to scale.

DETAILED DESCRIPTION

Figure 1:
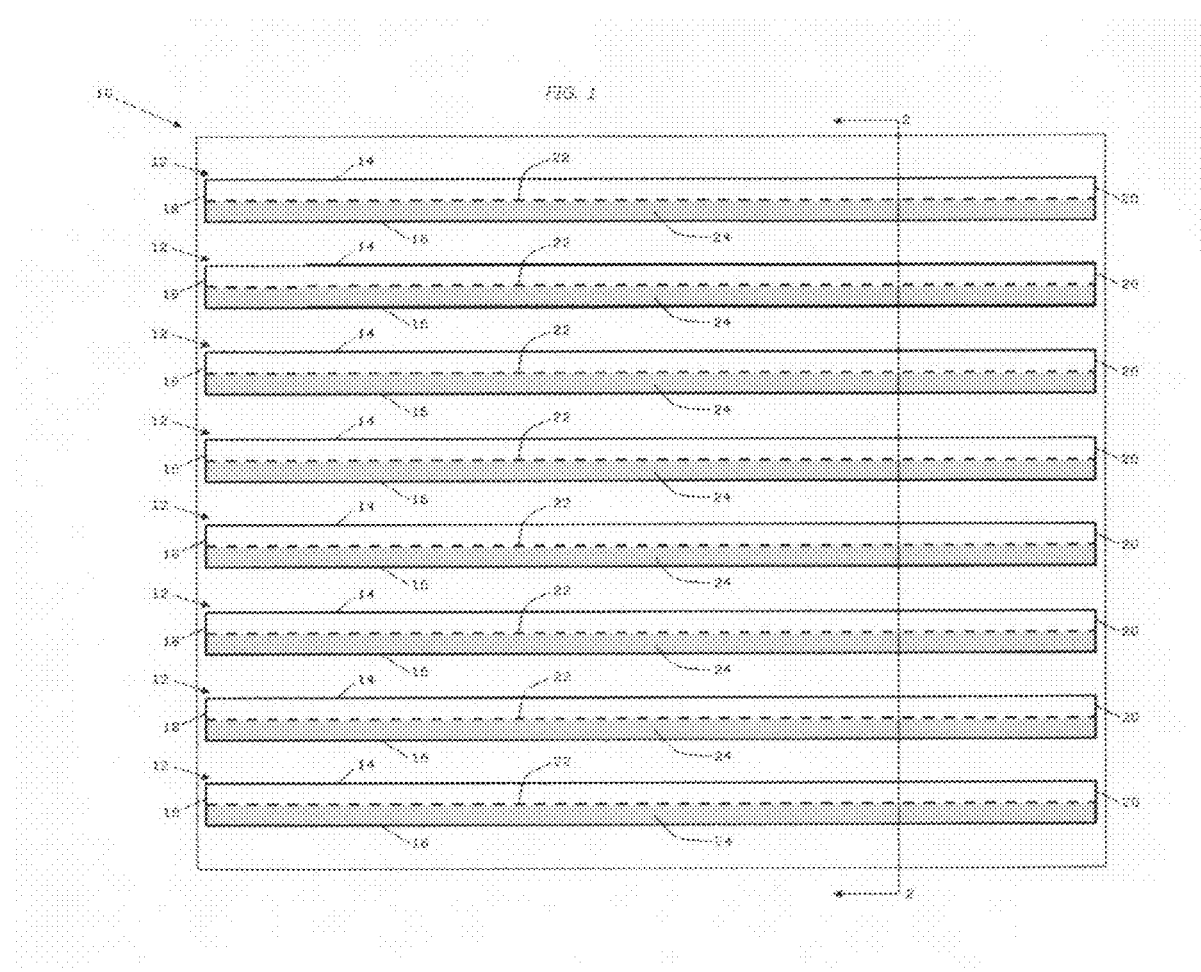
FIG. 1 is a view of the writing medium containing a plurality of rectangular boxes.

FIG. 1 is a view of a writing medium 10 containing a plurality of rectangular writing boxes 12 according to the present invention.

Writing medium 10 includes rectangular writing boxes 12. Each rectangular box 12 includes an upper horizontal line 14, a lower horizontal line 16, a first end line 18, a second end line 20, a dashed line 22 and a shaded area 24. The upper and lower horizontal lines 14, 16 are connected on each end by first end line 18 and second end line 20. Dashed line 22 is horizontal and located between upper horizontal line 14 and lower horizontal line 16 beginning at first end line 18 and ending at second end line 20. Shaded area 24 is located between lower horizontal line 14 and dashed line 22 from first end line 18 to second end line 20. Each rectangular writing box 12 is physically separated from every other rectangular writing box 12 on the medium.

Each rectangular writing box 12 is separated from every other rectangular writing box 12 to provide the user with clear visual clues as to where the writing is to be placed. First end line 18 provides user a visual clue of where writing is to begin on that line, and second end line 20 provides user a visual clue of where writing is to end on that line. Dashed horizontal line 22 and shaded area 24 provides user with visual clues relating to size and placement of letters, particularly relating to lower case letters.

The shaded area 24 gives a further visual cue helping the user easily distinguish the area where lower case letters should be placed as well as help with the specific sizing of the lower parts of letters. This shading particularly helps children or others who may be struggling with concepts of above and below learn size and placement. The user can understand that certain letters and certain parts of other letters should stay within the shaded area 24 of the paper only. A specific embodiment of this paper uses yellow as the shading color for area 24. Another embodiment uses blue as the shading color for area 24. This is because research has shown yellow and blue to be the most prominent colors that users are alerted to, therefore making the shading more effective.

Another feature of the invention is that lower horizontal line 16 is embossed, or raised slightly. This embossing gives the user tactile information of where the letters are to sit. It is raised enough to give the tactile cue that many letters are not meant to go below that line, but not so raised as to stop the user from writing over the line because some letters and letter tails do proceed below lower horizontal line 16.

An embodiment of the invention uses 50# paper as the writing medium. This provides a paper which is hefty enough to withstand heavy erasing by the user. This allows the user freedom to make mistakes and not tear the writing medium or destroy the visual and tactile cues provided if they need to erase large parts of previous writings on the medium.

When a plurality of the rectangular boxes 12 are provided on the writing medium, each rectangular box is separated from each other rectangular box 12. This helps the user to not confuse lines of one box providing visual and tactile clues with those of other boxes on other lines. This enables the user to write in one rectangular writing box 12 and upon coming to the end of it, easily know where to start in the next rectangular writing box, as well as easily see the cues for letter placement in the next box without confusing them with the cues from previous box.

Figure 2:
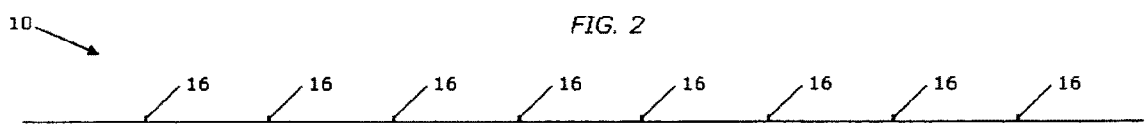
FIG. 2 is a side view of the writing medium along the 2-2 line.

FIG. 2 is a side view of the writing medium along the 2-2 line. This shows the embossed or raised horizontal lower lines 16 on the writing medium that will give the user tactile clues when writing. As mentioned above the line is raised enough to give the tactile cue, but not so raised as to stop the user from writing over the line. One embodiment would be to raise the line 0.625 inches.

Written espression difficulty as seen teachers, therapists, clinicians, is of all ages, and can be the result of neurological impairment. Therefore this invention has usefulness for a variety of situations and population. The writing medium can be used by teachers, therapists and others to teach, re-teach or improve handwriting of a user. The writing medium with the rectangular boxes providing visual and tactile cues can be explained to the user. The teacher, therapist or whomever is assisting can provide instructions to make words or individual letters by giving the user instructions based on the visual and tactile cues on the medium, thus providing the user easy tools to help learn and remember letter placement.

Although the present invention has been described with reference to preferred embodiments, workers skilled in the art will recognize that changes may be made in form and detail without departing from the spirit and scope of the invention.

The invention claimed is:

1. An instrument for improving handwriting, the instrument comprising:
   a writing medium;
   a plurality of lines forming a rectangular writing box on the writing medium;
      wherein the plurality of lines forming the rectangle comprises
      a solid upper horizontal line with a first end and a second end,
      a solid lower horizontal line with a first end and a second end,
      a first vertical line connecting the first ends of the upper and lower horizontal lines and
      a second solid vertical line connecting the second ends of the upper and lower horizontal lines;
      a dashed horizontal line between the upper and lower horizontal lines, extending from the first solid vertical line to the second solid vertical line;
   wherein an area between the dashed horizontal line and the lower horizontal line from the first end to the second end is shaded to be a different color than the writing medium; and wherein the lower horizontal line is raised.

2. The instrument of claim 1, wherein the area between the dashed line and the lower horizontal line is shaded yellow.

3. The instrument of claim 1, wherein the area between the dashed line and the lower horizontal line is shaded blue.

4. The instrument of claim 1, wherein the dashed line is located exactly equal distance from the upper horizontal line and the lower horizontal line.

5. The instrument of claim 1, wherein the lower horizontal line is raised 0.0625 inches.

6. The instrument of claim 5, wherein the lower and upper horizontal lines are separated by 0.5 inches.

7. The instrument of claim 6 wherein the length of the upper and lower parallel lines are 10.75 inches.

8. The instrument of claim 7, wherein the area between the dashed line and the lower line is shaded blue.

9. The instrument of claim 7, wherein the area between the dashed line and the lower line is shaded yellow.

10. The instrument of claim 1, wherein the writing medium is 50# paper.

11. An instrument for improving handwriting, the instrument comprising:
   a writing medium;
   a plurality of rectangular boxes on the medium, wherein each rectangular box comprises: an upper solid horizontal line with a first end and a second end, a lower solid horizontal line with a first end and a second end, a first solid vertical line connecting the first ends of the upper and lower horizontal lines and second solid vertical line connecting the second ends of the upper and lower lines;
   a dashed horizontal line between the upper and lower horizontal lines, extending from the first solid vertical line to the second solid vertical line; an area between the solid lower horizontal line and the dashed line from the first solid vertical line to the second solid vertical line which is shaded a different color than the writing medium;
   wherein the lower horizontal line is raised; and wherein each rectangular box is separated from the other rectangular boxes on the medium so that the length separating each rectangular box is larger than the length between the upper solid horizontal line and the lower solid horizontal line of each box.

12. The instrument of claim 11, wherein the medium is 50# paper.

13. The instrument of claim 11, wherein each box is 0.5 inches between the upper and lower horizontal lines and 10.75 inches from the first solid vertical line to the second solid vertical line.

14. The instrument of claim 13, wherein the shaded area is blue or yellow.

15. The instrument of claim 14, wherein the plurality of boxes is equal to 8, and wherein the boxes are spaced out equal distances from the sides of the medium and each other.

16. The instrument of claim 15, wherein the lower horizontal lines on each of the boxes is raised 0.0625 inches.

* * * * *